Dec. 3, 1963   E. D. HOBBS ETAL   3,112,655

DRIVING ARRANGEMENTS FOR GENERATORS

Filed Aug. 2, 1962

Inventors
Edwin D. Hobbs,
Trevor J. Crust
by Sommers + Young
Attorneys

3,112,655
DRIVING ARRANGEMENTS FOR GENERATORS
Edwin Daniel Hobbs, Chislehurst, Kent, and Trevor James Crust, Orpington, Kent, England, assignors to J. Stone & Company (Deptford) Limited, London, England
Filed Aug. 2, 1962, Ser. No. 214,371
Claims priority, application Great Britain Aug. 23, 1961
2 Claims. (Cl. 74—421)

This invention concerns improvements relating to arrangements for driving electrical generators on vehicles from an axle thereof by means of a belt and pulleys, particularly so-called train-lighting generators.

According to the invention, such an arrangement comprises a pulley mounted on bearings which are supported from the casing of the generator and enclosing step-up toothed gearing consisting of a ring of internal teeth provided on the inside of the pulley and a pinion provided on the generator shaft, which projects freely into the said pulley eccentrically of the latter.

Figure 1:
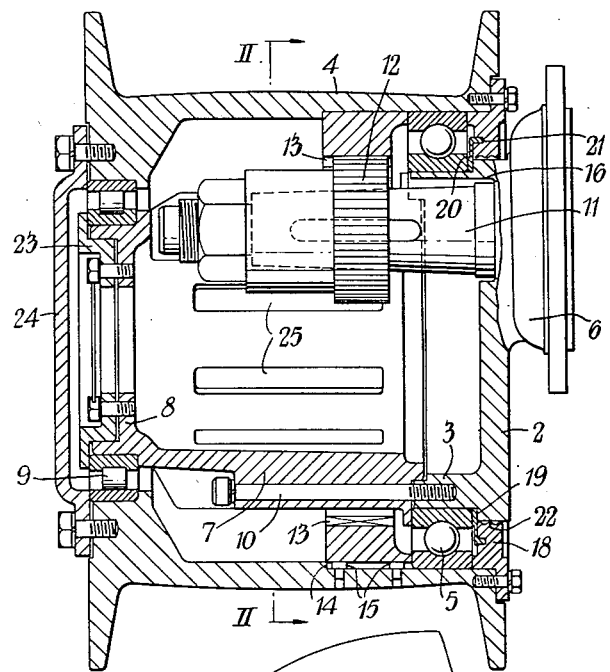

One manner of carrying the invention into effect will now be more fully described by way of example and with reference to the accompanying drawing, in which:

FIGURE 1 is an axial section through a generator pulley, and

Figure 2:
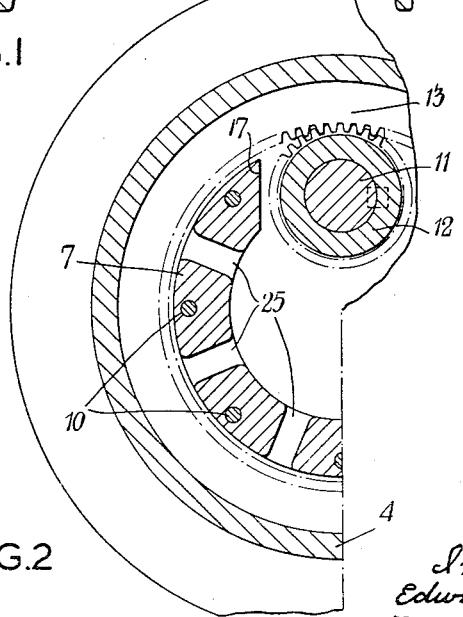

FIGURE 2 a partial cross section on the line II—II in FIGURE 1.

Assuming that the generator (not shown) is an existing type of D.C. or A.C. machine, the place of the usual outer bearing cap is taken by a bracket-like member 2 having an axial flange 3 which extends into the flanged belt pulley 4 and supports it at its inner end by way of a ball bearing 5. The member 2, which is integral with or rigidly attached to a part 6 attachable to the casing of the generator, is extended by a cage-like part 7 which projects through the pulley 4 and is formed with a ring 8 by which the pulley is supported at its outer end by way of a roller bearing 9 of smaller diameter than the bearing 5. The part 7 is fixed to the member 2 by studs 10. The pulley 4 is thus not mounted on the generator shaft 11 and the belt pull does not fall upon the latter. The shaft 11 itself extends freely into the open interior of the pulley 4, in which it is located eccentrically, and has keyed to it a pinion 12 meshing with an internally toothed gear ring 13 fixed in the interior of the pulley 4 near its inner end, for example by means of a shoulder 14 and key means 15. The upper part of the member 2 has an opening 16 through which the shaft 11 freely passes and the part 7 is interrupted at 17 (FIGURE 2) to accommodate the said shaft and the pinion 12.

The outer race of the inner bearing 5 is clamped between the gearing 13 and a flanged bearing cap 18 bolted to the adjacent end of the pulley 4. A grease or oil throwing ring 19, clamped between the inner race of the bearing 5 and the member 2, has a web 20 extending into a gap between the bearing 5 and cap 18 and a small flange 21 projecting into an annular groove in the inner face of the said cap. A seal, for example a labyrinth seal 22, is provided between the cap 18 and member 2. The inner race of the bearing 9 is secured by a clamping ring 23 bolted to the ring 8 of the part 7. The outer race of the bearing 9 is secured by a cover 24 bolted over the open free end of the pulley 4. The closed interior of the pulley can therefore serve to retain lubricant. The openings 25 in the cage-like part 7 allow lubricant to find its way back to the interior of the pulley 4.

The above-described construction permits of easy assembly of the driving arrangement.

I claim:

1. A driving apparatus for an electrical generator for a vehicle, comprising, in combination with the generator, a belt pulley to be driven from an axle of the vehicle, a bracket connected to the generator casing, said bracket being extended by a part which projects through said pulley, rolling bearings on which the pulley is mounted at its inner and outer ends and which are supported by said member and part respectively, and step-up toothed gearing which is enclosed within said pulley and is comprised of a ring of internal teeth provided on the inside of said pulley and of a pinion provided on the generator shaft, said shaft projecting freely into the said pulley eccentrically thereof.

2. Apparatus according to claim 1, and in which said part by which the bracket is extended is formed as a cage through openings in which lubricant can pass.

References Cited in the file of this patent
UNITED STATES PATENTS

| | | |
|---|---|---|
| 1,416,063 | Reddig | May 16, 1922 |
| 1,693,696 | Franklin | Dec. 4, 1928 |
| 2,439,520 | Miller | Apr. 13, 1948 |